W. OSTERMEYER.
Band Cutter.

No. 86,684.

Patented Feb. 9, 1869.

WITNESSES

INVENTOR

WILLIAM OSTERMEYER, OF KANE, ILLINOIS.

Letters Patent No. 86,684, dated February 9, 1869.

IMPROVEMENT IN FEEDER FOR THRESHING-MACHINES.

The Schedule referred to in these Letters Patent and making part of the same.

*To all whom it may concern:*

Be it known that I, WILLIAM OSTERMEYER, of Kane, in the county of Green, and State of Illinois, have made certain new and useful Improvements in Feeder for Threshing-Machines; and I do hereby declare that the following is a full and clear description thereof, reference being had to the accompanying drawings, and to the letters of reference marked thereon.

The object of this invention is to cut the bands of sheaves of grain, and open and scatter the sheaves, so as to feed them evenly to a threshing-machine, thereby avoiding that most dangerous of labor, feeding threshing-machines by hand, and at the same time distributing the straw to the machine in an even manner, thereby facilitating the operation of the threshing-machine.

To enable those skilled in the art to make and use my improved feeding-apparatus, I will proceed to describe its construction and operation.

Figure 1 of the drawings is a plan of the improved apparatus;

Figure 1:
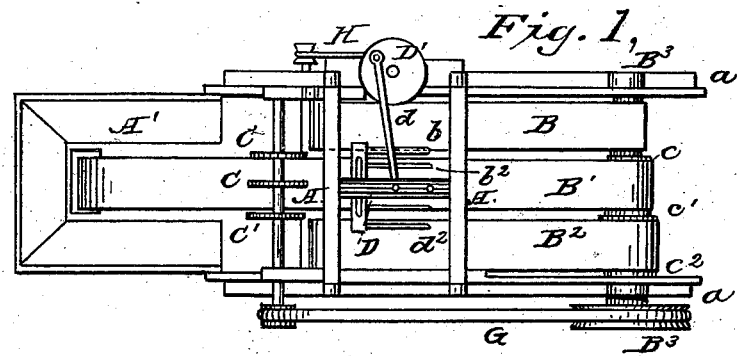
Figure 2:
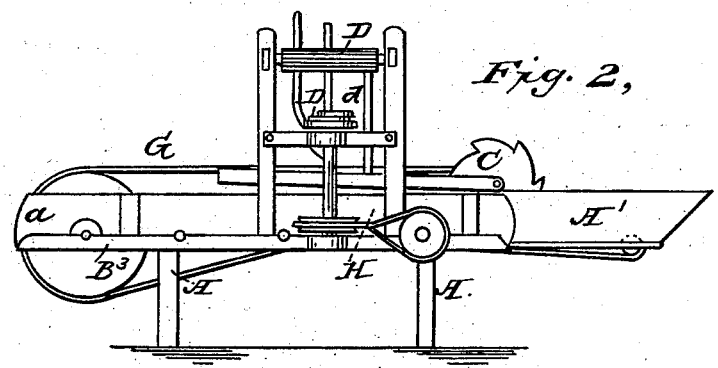
Figure 2 is a side elevation of the same.
Figure 3:
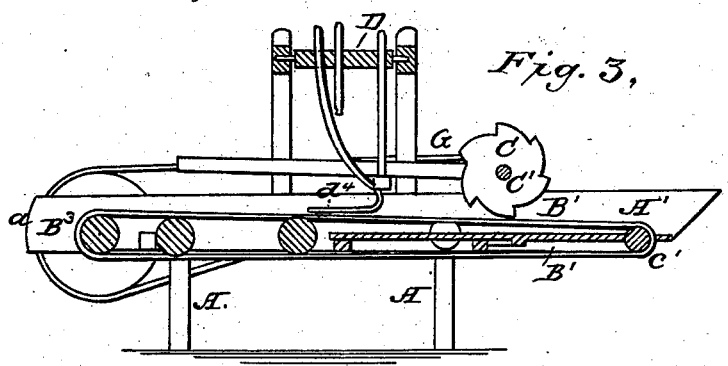
Figure 3 is a longitudinal sectional elevation.

A box, or frame-work, A, supports the operative parts of the machine, and its rear, sloping ends $a$, are to be attached to the threshing-machine, not shown.

The forward end of the machine has a hopper, A', into which the uncut sheaves are to be thrown.

In the bottom of the box A are placed three conveyer-belts, B B' B$^2$, each driven from the shaft B$^3$ by wheels $c$ $c'$ $c^2$, each differing in size from the others, so as to cause each of the three aforesaid belts to travel at a different speed from the others.

The fastest belt is placed at one side of the machine, and the slowest one at the other side, with the one of intermediate speed in the centre, thus giving the straw of the sheaf, as it is drawn forward in the machine, a zigzag motion across the machine, thereby greatly distributing and scattering the sheaf, and fitting it perfectly for passing to the thresher.

It is evident that two or more of these conveyer-belts might be used in the manner above described, so as to produce the same result, or nearly the same, as the three conveyers, but the use of the three is probably the best.

The central belt passes forward into the hopper A', and receives the sheaf as it is thrown therein, and carries it back to the band-cutters C, which are placed upon and operated by the transverse shaft C'.

These band-cutters are circular, serrated blades, the convex edges of which are sharpened, and they are revolved, so as to bring these sharpened edges in contact with the wire, or other bands, of the sheaves, as they are drawn by the belt under the said cutters. There may be one, two, or more, of the said cutters arranged on the shaft C', at short intervals, so as to strike the band of the bale in whatever position it may approach the cutters.

A longitudinal rock-shaft, D, is placed over the top of the machine, and operated by the crank-wheel D' and the connecting-rod $d$.

Attached to the bottom side of the said rock-shaft are vertical rake-fingers, or scatterers, $d^2$, which are operated by the said rock-shaft in a vibratory rocking motion across the machine, so as to scatter and divide the sheaf across the conveyers.

Motion is to be transmitted to the driving-shaft C' from the threshing-machine, or the power driving the same, by means of belts or gearing, not shown, and from this driving-shaft motion is transmitted to the other parts of the machine, through the medium of the belts, or gearing, G H.

The sheaf, then, is first thrown into the hopper A', and thence carried by the belt B' under the band-cutters C, after which it is distributed laterally by the fingers $d^2$, and finally delivered to the threshing-machine on the beltings B B' B$^2$.

Having described my invention,

What I claim, is—

1. The belting-conveyers B B' B$^2$, when arranged so as to travel at different degrees of speed, for the purpose of distributing the straw in a lateral manner, as described and set forth.

2. The lateral distributers $d^2$, as and for the purpose shown and described.

In testimony of which invention, I hereunto set my hand, in presence of—

WILLIAM OSTERMEYER.

Witnesses:
M. RANDOLPH,
GEO. P. HERTHEL, Jr.